United States Patent
Gamliel et al.

(10) Patent No.: US 6,270,291 B2
(45) Date of Patent: Aug. 7, 2001

(54) METHOD FOR APPLYING PLASTIC SOIL MULCH

(75) Inventors: Avraham Gamliel, Kefar Hanagid; Eliezer Becker, Kibbutz Niroz M, both of (IL)

(73) Assignee: State of Israel Ministry of Agriculture (IL)

( * ) Notice: Subject to any disclaimer, the term of this patent is extended or adjusted under 35 U.S.C. 154(b) by 0 days.

(21) Appl. No.: 09/202,575

(22) PCT Filed: Jul. 2, 1997

(86) PCT No.: PCT/IL97/00222
§ 371 Date: Oct. 18, 1999
§ 102(e) Date: Oct. 18, 1999

(87) PCT Pub. No.: WO98/01510
PCT Pub. Date: Jan. 15, 1998

(30) Foreign Application Priority Data

Jul. 4, 1996 (IL) .................................................... 118787

(51) Int. Cl.⁷ .......................... C09K 17/00; C09K 17/52; E02D 3/12
(52) U.S. Cl. ............................ 405/263; 405/270; 523/132
(58) Field of Search .................................. 405/263, 270; 523/131, 132; 424/405

(56) References Cited

U.S. PATENT DOCUMENTS

| | | | |
|---|---|---|---|
| 3,798,838 | * 3/1974 | Hashimoto et al. | 523/132 |
| 3,873,487 | * 3/1975 | Minato et al. | 523/132 |
| 3,876,439 | * 4/1975 | Schneider | 405/263 |
| 4,690,589 | * 9/1987 | Owa | 405/263 |
| 4,705,816 | * 11/1987 | Pole et al. | 523/132 |
| 4,793,741 | * 12/1988 | Lahalih et al. | 405/263 |
| 4,988,238 | * 1/1991 | Szekely et al. | 405/263 |
| 5,018,906 | * 5/1991 | Bonier-Sahuc | 405/263 |
| 5,389,702 | * 2/1995 | Koo | 523/132 |
| 5,516,830 | * 5/1996 | Nachtman et al. | 523/132 |
| 5,770,639 | * 6/1998 | Ritter et al. | 523/132 |
| 5,779,782 | * 7/1998 | Spittle | 523/132 |
| 5,846,601 | * 12/1998 | Ritter et al. | 523/132 |
| 5,860,770 | * 1/1999 | Hunt | 405/263 |
| 5,971,295 | * 10/1999 | Jensen et al. | 239/77 |
| 6,000,625 | * 12/1999 | Cole | 239/10 |

* cited by examiner

Primary Examiner—Thomas B. Will
Assistant Examiner—Alexandra Pechhold
(74) Attorney, Agent, or Firm—Mayer, Brown & Platt

(57) ABSTRACT

A method for applying liquid plastic polymers to soil surfaces in order to form a continuous membrane film for soil mulch. The plastic mulch is useful for enhancing crop production, disinfestation of soil by solarization and prevention of soil erosion. Additionally, the invention includes procedures for applying and spraying the liquid plastic polymers to form an effective and economic film.

20 Claims, No Drawings

METHOD FOR APPLYING PLASTIC SOIL MULCH

FIELD OF THE INVENTION

The present invention relates to a method for applying liquid plastic polymers to soil surfaces in order to form a continuous membrane film for soil mulch. This plastic mulch is useful particularly for enhancing crop production, disinfestation of soil by solarization and prevention of soil erosion. The invention encompasses a set of applying procedures and spraying means for effective and economic film forming consisting of two stages: a) appropriate soil preparation, and b) applying of appropriate polymer spray formulation in at least two coats by novel spray means sand spraying procedure.

BACKGROUND OF THE INVENTION

Plastic mulch is an essential and widely used method in various agricultural practices. In field crop and vegetable production there is an increasing use of soil mulching with plastic films. Soil mulching during cold seasons results in elevated soil temperatures and enhanced seedling emergence, plant growth and crop production. Summer crops such as corn, peanuts and cotton cannot be planted early in the season. Therefore planting is delayed to late spring and growth season is extended to late fall. Therefore, the crop is exposed to severe damage by early rains. A method for increasing soil temperature allows planting early in the season and increasing the potential of crop yield. Soil mulch during crop growth provides various benefits. Mulch can be used for the purpose of repelling insects. Silver or yellow mulches are used to repel aphids and to prevent damage from their feeding and from transmission of viruses. White film can be used to reduce soil temperature during hot periods. Mulch can also provide protection from rot of fruit touching the soil, such as tomato, melon and watermelon.

Soil solarization is a method for soil disinfection consisting of covering the soil with transparent plastic films during the summer. The soil is heated for a period of a few weeks thus effectively controlling various soilborne pests. Applying plastic films for soil mulch is complicated. It requires special mulching equipment and involves special procedures. The film's edges should be buried to hold the film in place, and in continuous mulch the sheets are glued together. It is not possible to change the mulching pattern while working and capacity of area coverage is limited. When applying to a planted field, the sheets have to be perforated or be removed immediately after emergence to allow seedling growth. Plastic mulches have to be removed from the fields during or at the end of crop growth. Plastic removal is expensive and requires intensive labor. Plastic residues are often left in the field causing problems to agricultural practices, machinery and future crops. The present invention overcomes these disadvantages and provides a new method for soil mulching by spraying latex-based polymers. Although patents related to spraying polymer dispersions were previously issued, these patents focused on polymer type and formulation, composition and use and all of these patents consider the use of available commercial sprays which are not appropriate for creating a membrane film at low rates of spray. Therefore, the actual volume of spray required for effective cover is between 200 to 2000 ml/m$^2$, which is very high.

U.S. Pat. No. 2,961,799 discloses a method for treating soil to prevent erosion. The method involves applying to the soil a composition comprising about 0.5 to 5, preferably about 2 to 4, weight percent of water insoluble rubber and 0.005 to 0.5, preferably about 0.05 to 0.15, weight percent of a counter penetrant at a rate providing about 0.25 to 5 ounces per square yard. The counter penetrant is used to prevent the compound from significantly penetrating the top layer of the soil. The type of sprayer used is not important as long as it enables applying an even coating with relatively easy control.

British patent 1,007,671 discloses a process for controlling soil erosion. The process comprises applying to the soil a latex of an oil extended rubber. The rubber latex may be extended with 50 to 1000 parts by weight of oil per 100 parts by weight of rubber. The latex is applied at a rate providing about 40 to 300 grams per square meter. The latex is applied at a solids' content of about 5 to 30 percent.

U.S. Pat. No. 4,705,816 comprises a significantly higher solids level than that in first U.S. patent mentioned. The higher solid level is accomplished by the addition of filler compound. This formulation rapidly dries to form a crust on the soil surface. Commercially available spraying equipment may be used in this invention as in the other inventions mentioned.

Application of polymer dispersion for soil mulch is not simple and cannot be regarded as spraying other chemicals, such as herbicides. Soil surface is not smooth and is porous. Soil surface should be smooth and compact to carry the spray film and to prevent leaching of the dispersion. The latex dispersion is viscous and flows through the sprayers in a different pattern than common liquid sprays. Therefore, the design of commercially available sprayers is not appropriate for the purpose of a uniform film at rates as low as 30 gr/m$^2$.

The above mentioned patents refer to the use of commercially available sprays for application of the dispersion. In practice, all these inventions must use a relatively high dosage of spray to accomplish a uniform and appropriate coat, for the desired agricultural demands.

The present invention provides a novel method for applying liquid plastic polymers to soil surfaces in order to form a continuous membrane film. This spray mulch is for the purpose particularly of enhancing crop production, disinfestation of soil by solarization and prevention of soil erosion. The present method for spray application of polymer mulch offers a feasible and cost effective alternative to plastic mulch. The procedure used in the present invention results in dramatic reduction of the volume of the spray required.

The polymer according to the present invention may be applied by spraying the desired quantity. The sprayer of the present invention consists of spraying units and placement to provide the appropriate droplet size and multiple overlapping of the spray at each spot on the soil, in order to form a uniform continuous film on the non smooth pattern of soil surface. The flexibility of nozzle type to be used according to the present invention, gives the advantage of adjusting boom height according to field conditions and weather.

As used in this specification, the term "soil mulch" includes applying coats to cover the soil of trays of flowers or vegetables grown in greenhouses, fields such as in growing cereals including corn and sorghum in vegetable and fruit farms, outdoor nurseries for trees, shrubs and plants and also various agricultural practices, including raised beds, flat areas and others. The term—"Applying liquid polymer to soil surface in order to form a continuous membrane film" as used in this specification, means that when the compound is applied at a desired rate to the surface of soil or of an artificial medium, it will form a flexible film according to polymer formulation and characteristics. This film provides a porous membrane that can withstand normal agricultural practices expected during crop growth. The level of permeability of the membrane film can be adjusted by the volume of compound which is sprayed.

As used in this specification, the term "appropriate polymer" refers to any polymer that can be used to create plastic film.

"Diluted formulation of the polymer", unless otherwise indicated, refers to any percent of polymer, though, in the primer coating, 8% of polymer in the formulation is preferable, being the most economical.

SUMMARY OF THE INVENTION

The present invention provides a novel method for applying liquid plastic polymers to soil surfaces in order to form a continuous membrane film for soil mulch. The method related to in the present invention comprises: a) smoothing and saturating the soil surface, b) coating soil with plastic coats by spraying an appropriate polymer formulation for forming said plastic coats on said soil by spraying means, wherein the polymer formulation is applied in at least two coats, first a basic coat consisting of a diluted formulation of the polymer and successively other coats consisting of up to 40% polymer and wherein the spraying means are comprised of a sprayer unit consisting of a boom whose spraying line is mounted with flat fan nozzles placed at short distances apart.

The plastic mulch produced by the method of the present invention is useful particularly for enhancing crop production, disinfestation of soil by solarization and prevention of soil erosion.

DETAILED DESCRIPTION OF THE INVENTION

The present invention provides a new method for soil mulching by spraying latex-based liquid polymers. The invention encompasses a set of applying procedures and spraying means for effective and economic film forming consisting of appropriate soil preparation, double coating and specifically designed spraying means. This applying procedure enables the formation of a continuous membrane film using low volumes of polymer. The polymer composition used by the present invention forms a membrane film on the soil through which seedling can emerge and later grow on the mulch. The membrane formed keeps its integrity and can serve to increase soil temperature, prevent evaporation and enhance seedling emergence in cold seasons. Nevertheless, the membrane is porous and allows for postplant irrigation and fertilization. In addition, mulching prevents soil erosion and plant destruction from sand storms in sandy soils.

The method according to the present invention includes essential stages for forming membrane film for soil mulch: a) soil preparation and irrigation, and b) applying of appropriate polymer in at least two coats. The coating stage is carried out by using novel spraying means and spraying procedure.

a) Soil preparation

The polymer formulation should be applied to well prepared soil. Soil to be mulched should be well rotavated to break all clods and achieve a flat and smooth surface. Preferably, rolling of the soil is applied to compact soil surface to create a smooth surface. The soil should be irrigated enough for free water to accumulate on the soil surface, before applying the mulch, in order to ensure film forming. Applying the polymer to dry soil and to soil with clods will result in leaching of the polymer, preventing the formation of film. The field may be formed in raised beds or remain flat according to crop requirements. If mulch is applied for enhancing seedling emergence, the seeds should be planted prior to the field being rolled and irrigated. Since the film is porous, herbicides and fertilizers can be applied after the mulch has been applied. When mulch is intended for soil solarization, supplemental irrigation can be applied once a week to cover the water evaporation from the top layer under the mulch. The present invention is not intended for soil fumigation since it forms a porous film which is permeable to most fumigant.

b) Applying the appropriate polymers in at least two coats.

There are a great many types or families of polymers which may be used in accordance with the present invention. Soil temperature during applying will influence the selection of polymer. Polymers used during cold seasons should be able to form a film at a temperature of less than 10° C. The purpose of the mulch and the length of time the film is to remain on the soil will influence the selection of polymer and formulation.

The polymer formulation to be applied consists preferably of one or more of the following, (up to 40%) polyixprene, polyvinylacetate, poly vinylpyrolidone, SBR, styrene-acryl copolymer and styrene-butadiene copolymer. The formulation contains all the desired ingredients for the purpose of the mulch and infrared absorbing ingredients (hereinafter called IR ingredients) and dyes such as carbon black or other dye. The dyes are used according to mulch purposes The formulation does not contain any filler compound since the aim of the present invention is to form a film and not a crust.

The polymer should be applied to a prepared field in two or more coats. The first or primer coat consists, most preferably, of diluted formulation of up to 8% of polymer. The aim of the primer coat is to form a coat to carry the second and main coat and to prevent leaching of the coat onto the soil. Such a procedure enables the use of a minimal dosage of the second coat. The second and main coat consists of up to 40% of the polymer which forms the desired membrane film.

In the practice of the present invention it is desirable for the sprayable polymer to have no, or minimal, detrimental effects on the environment. The components in the sprayable liquid will usually stay in the soil for the expected length of time, while the soil will be subject to many agricultural treatments. Therefore, when selecting the ingredients of the mulch, information about the effect of each ingredient and its residues, on the environment, should be available.

Applying the polymer spray may be done by using novel spraying means and procedures. The two coats may be applied separately in two sprayer operations or in one by using a dual spraying system. In a preferred embodiment of the invention, a dual spraying system is used as described below, to minimize labor and application costs.

Polymer formulation should be sprayed by a specifically adjusted sprayer. The latex mulch is viscous and flows through the sprays in a different mode than common sprays. Therefore, the commercial sprayers available cannot produce a uniform film at rates as low as 30 gr/m². The sprayer of the present invention consists of a spraying unit preferably comprising a boom with two spraying lines. The main line is mounted with flat fan nozzles placed at 25 cm distances. The condensed arrangement of nozzles provides a triple overlapping of the spray at each spot on the soil, thus forming a uniform continuous film. The nozzle specification as described below allows for adjustment of the sprayer. The second spraying line on the boom is for the purpose of covering the aisles between the beds when full coverage of the field is needed. This applies mainly when the beds are narrow (such as in potato production), for soil solarization or for preventing soil erosion. The nozzles on this line can be moved along the line to adjust the spacing according to specific bed width. The nozzles on this line should be flat fan with a narrow angle pattern to spray only the aisles.

Nozzles on the main boom may be with a wide angle pattern (95°–110°) or a narrow angle pattern (65°–80°) and capacity of 1–2 l/min according to the field specification. When applying the mulch on sandy soil a high level of smooth surface can be accomplished. Therefore, a wide angle nozzle type is used. If spray is applied on loessial or clay soil, then soil surface is more grainy. In such cases a narrow angle nozzle type is used with the same capacity. This provides larger droplets for better coverage of the grainy surface and for forming the film at the desired volume of spray. The flexibility of the nozzle type to be used gives the advantage of adjusting boom height according to field conditions (over sprinkles), and weather (wind).

As noted, a two-coat spray is applied. These two coats may be applied in two consecutive passes. The preferred application is by one pass using a dual system sprayer. This sprayer has two separate systems (including tank, pump and boom) for spraying each coat independently. The sprayers may be assembled together with the booms at least 40 cm apart. The system may consist of two separate sprayers with the two booms mounted in front and at the back of a tractor to accomplish the same results. Using a dual spray system, as described, enables to spray the primer and the main coat consecutively in one pass. This procedure is time saving and economical. Also it prevents the destruction of the primer film on the aisles by the tractor wheels when the spraying is carried out in two passes with a single spray system. The sprayer may also comprise of a third system used for rinsing the sprayer, to avoid clogging of the lines and nozzles.

The combination of polymer composition, soil preparation and applying procedure used in the present invention contributes to the formation of a membrane film using significantly low volumes of spray. In this invention latex polymers may be applied to agricultural use in order to enhance seedling emergence and crop production and may be used for solarization. Moreover, this technology can be applied to a wide spectrum of soil types and not just to sandy soils which are specified in the previously mentioned patents.

The said invention will be further illustrated by the following experiments. These experiments do not intend to limit the scope of the invention but to demonstrate and clarify it only.

1) A field in Nir—Oz was prepared for peanut cropping. The field was ploughed, bed shaped (1.93 m) and planted with peanuts.

Peanuts were planted on three dates: Mar. 4, 1995, Mar. 20, 1995 (which are early for peanut planting) and Apr. 4, 1995 (the common date for peanut planting in Israel). After planting, the field beds were rolled to smooth the surface, herbicide sprayed and sprinkle irrigated.

Plots (four beds wide and 36 m long) were treated as follows:
a. No treatment (control)
b. Sprayed with polymer formulate at a rate of 30 gr/m². The compound was applied in two coats; A primer coat consisting of 8% of polystyrene acryl and the main coat consisting of 40% of the same polymer.

The compositions were applied in accordance with the present invention and formed a continuous film. The mulched area was black. Air and soil temperature at depth of 5 cm were continuously monitored. The results are shown in table 1.

Maximal soil temperature in the mulched plots was 5–8 degrees higher throughout crop growth. Emergence of peanut seedling was enhanced in mulched plots at all planting dates (table 1). The final plant was also higher. Peanut pods were harvested early in the plantings and yield was higher as shown in table 2. The results show that peanuts which were planted very early in the season and were grown on polymer mulch, gave significantly higher yield. It is important to note that even on the common planting date, soil mulch had advantage and gave higher yield.

TABLE 1

Effect of polymer mulch and planting date on peanut emergence.

| Days from planting | 5 March control | 5 March spray | 20 March control | 20 March spray | 4 April control | 4 April spray |
|---|---|---|---|---|---|---|
| 11 |  |  |  |  | 0 | 12 |
| 12 |  |  | 0 | 15 |  |  |
| 14 |  |  | 1 | 41 | 40 | 81 |
| 15 | 0 | 12 |  |  |  |  |
| 16 |  |  | 2 | 58 |  |  |
| 17 | 1 | 56 |  |  | 75 | 93 |
| 18 |  |  | 7 | 76 |  |  |
| 19 | 16 | 75 |  |  |  |  |
| 20 |  |  |  |  | 90 | 98 |
| 21 |  |  | 66 | 90 |  |  |
| 23 | 50 | 84 |  |  |  |  |
| 24 |  |  | 82 | 95 |  |  |
| 25 | 63 | 86 |  |  |  |  |
| 27 | 76 | 89 | 86 | 98 |  |  |
| 31 | 84 | 94 |  |  |  |  |

TABLE 2

Effect of polymer mulch and planting date on soil temperature and peanut production

| planting date | 5 March | | 20 March | | 4 April | |
|---|---|---|---|---|---|---|
| treatment | control | spray | control | spray | control | spray |
| max. soil temp. 10 March | 25 | 31 |  |  |  |  |
| max. soil temp. 22 March | 24 | 30 | 24 | 30 |  |  |
| harvesting date | 25 August | | 30 August | | 20 September | |
| growing period (days) | 172 | 172 | 168 | 168 | 166 | 166 |
| yield gr/m² | 520 | 700 | 510 | 710 | 670 | 830 |

2) A field in Nir—Oz was prepared beet cropping. The field was ploughed, bed shaped (1.93 m wide) and planted with beet.

Three beet cultivars were planted on 20 November. After planting, the field beds were rolled to smooth the surface, herbicide sprayed and sprinkle irrigated.

Plots (five beds wide and 180 m long) were treated as follows:
a. No treatment (control)
b. Sprayed with polymer formulate at a rate of 40 gr/m². The compound was applied in two coats; A primer coat consisting of 8% of polystyrene acryl and the main coat consisting of 40% of the same polymer.

The compositions were applied in accordance with the present invention and formed a continuous film. Air and soil temperature at depth of 5 cm were continuously monitored.

TABLE 3

Effect of polymer mulch and planting date on soil temperature and beet production

| cultivar | Mobol | | Red Ace | | Madona | |
|---|---|---|---|---|---|---|
| treatment | control | spray | control | spray | control | spray |
| max. soil temp. 25 November | 15 | 19 | | | | |
| max. soil temp. 10 December | 17 | 21 | | | | |
| yield ton/ha | 50.5 | 67.1 | 75.0 | 79.2 | 62.7 | 73.2 |

Maximal soil temperature in the mulched plots was 3–5 degrees higher throughout crop growth. Beet was harvested in May 1996, and yield was higher in all cultivar tested as shown in table 3. The results show that beet gave significantly high yield in the mulched plots. It is important to note that the coat was in the field during the winter and was exposed to rain and irrigation. Nevertheless, the film kept its integrity and promoted plant growth and yield.

What is claimed is:

1. A method for applying plastic coats on soil comprising: a) smoothing and saturating the soil surface, b) coating said soil with plastic coats by spraying an appropriate polymer formulation for forming said plastic coats on said soil by use of spraying means, wherein the polymer formulation is applied in at least two coats, first a primer coat consisting of a diluted formulation of up to 8% by weight polymer and successively at least one other main coat consisting of up to 40% by weight polymer, the at least two coats forming a film having a coat weight of not more than 30 g/m$^2$.

2. A method for applying plastic coats on soil according to claim 1 wherein the spraying means are comprised of a sprayer unit consisting of a boom whose spraying lines are mounted with flat fan nozzles placed at short distances apart.

3. A method for applying plastic coats on soil according to claim 2 wherein the sprayer unit comprises a boom with two spraying lines, the main line is mounted with flat fan nozzles placed at short distances apart having a wide or narrow angle pattern and the second spraying line being mounted with flat fan nozzles having a narrow angle pattern.

4. A method for applying plastic coats on soil according to claim 3 wherein the nozzles mounted on the boom are placed at a distance of 25 cm or less from each other.

5. A method for applying plastic coats on soil according to claim 3 wherein on the main line the angle of the flat fan nozzles is about 65°–110°, and on the second line, the angle of the second boom flat fan nozzles is about 50°–80°.

6. A method for applying plastic coats on soil according to claim 3 wherein each of the flat fan nozzles has a capacity of about 1–2 liter/minute.

7. A method for applying plastic coats on soil according to claim 2 wherein the application of the at least two coats is by applying the polymer formulation in two passes or in a single pass using said spraying means having a triple tank and boom system, each tank having its own boom, wherein one tank is used for the primer coat, one tank is used for the at least one other main coat and one tank is used for rinsing the sprayer.

8. A method for applying plastic coats on soil according to claim 1 wherein the spray formulation comprises one or more polymers, appropriate for forming plastic coats, by spraying.

9. A method for applying plastic coats on soil according to claim 8 further comprising infrared ingredients and an appropriate dye.

10. A method for applying plastic coats on soil according to claim 8 wherein the polymer formulation for spraying is selected from one or more of the following materials: polyixprene, polyvinylacetate, poly vinylpyrolidone, SBR, styrene-acryl copolymer and styrene-butadiene copolymer.

11. A method for applying plastic coats on soil according to claim 1 wherein smoothing the soil surface is achieved by rotavating and rolling of the soil.

12. A method for applying plastic coats on soil according to claim 1 wherein saturating the soil is by irrigating the soil until free water accumulates on the soil surface.

13. A method for applying plastic coats on soil according to claim 1 wherein the polymer formulation is applied in two coats of spray; first a primer coat comprising a diluted polymer dispersion with addition of infrared ingredients consisting of up to 8% by weight polymer and a second main coat comprising a dispersion consisting of up to 40% by weight polymer.

14. A method for applying plastic coats on soil comprising: a) smoothing and saturating the soil surface, b) coating said soil with plastic coats by spraying an appropriate polymer formulation for forming said plastic coats on said soil by use of spraying means, wherein the polymer formulation is applied in at least two coats, first a primer coat consisting of a diluted formulation of up to 8% by weight polymer and successively at least one other main coat consisting of up to 40% by weight polymer to form a film having a coat weight of not more than 30 g/m$^2$; wherein the spraying means are comprised of a sprayer unit consisting of a boom whose spraying lines are mounted with flat fan nozzles placed at short distances apart; and wherein the application of the at least two coats is by applying the spray in two passes or in a single pass using said spraying means having a triple tank and boom system, each tank having its own boom, wherein one tank is used for the primer coat, one tank is used for the main coat and one tank is used for rinsing the sprayer.

15. A method for applying plastic coats on soil according to claim 14 wherein the spray formulation comprises one or more polymers, appropriate for forming plastic coats, by spraying.

16. A method for applying plastic coats on soil according to claim 15 further comprising infrared ingredients and an appropriate dye.

17. A method for applying plastic coats on soil according to claim 15 wherein the polymer formulation for spraying is selected from one or more of the following materials: polyixprene, polyvinylacetate, poly vinylpyrolidone, SBR, styrene-acryl copolymer and styrene-butadiene copolymer.

18. A method for applying plastic coats on soil according to claim 14 wherein smoothing the soil surface is achieved by rotavating and rolling the soil.

19. A method for applying plastic coats on soil according to claim 14 wherein saturating the soil is by irrigating the soil until free water accumulates on the soil surface.

20. A method for applying plastic coats on soil according to claim 14 wherein the polymer formulation is applied in two coats of spray; first a primer coat comprising a diluted polymer dispersion with addition of infrared ingredients consisting of up to 8% by weight polymer and a second main coat comprising a dispersion consisting of up to 40% by weight polymer.

* * * * *